(12) United States Patent
Liu et al.

(10) Patent No.: US 8,468,343 B2
(45) Date of Patent: Jun. 18, 2013

(54) SYSTEM AND METHOD FOR SECURING WIRELESS TRANSMISSIONS

(75) Inventors: Tie Liu, College Station, TX (US); Yufei Blankenship, Kildeer, IL (US)

(73) Assignee: FutureWei Technologies, Inc., Plano, TX (US)

( * ) Notice: Subject to any disclaimer, the term of this patent is extended or adjusted under 35 U.S.C. 154(b) by 617 days.

(21) Appl. No.: 12/686,995

(22) Filed: Jan. 13, 2010

(65) Prior Publication Data

US 2011/0173446 A1     Jul. 14, 2011

(51) Int. Cl.
*H04L 29/06* (2006.01)
*H04L 9/32* (2006.01)
*H04K 1/00* (2006.01)

(52) U.S. Cl.
USPC ........... 713/166; 713/170; 713/177; 713/181; 380/255; 380/270

(58) Field of Classification Search
None
See application file for complete search history.

(56) References Cited

U.S. PATENT DOCUMENTS

| | | | | |
|---|---|---|---|---|
| 6,314,188 | B1 * | 11/2001 | Ishibashi | 380/201 |
| 7,212,634 | B2 | 5/2007 | Briscoe | |
| 2008/0285747 | A1 | 11/2008 | Kim et al. | |
| 2009/0080665 | A1 | 3/2009 | Patel | |
| 2010/0041389 | A1 * | 2/2010 | Cave et al. | 455/423 |
| 2010/0211787 | A1 * | 8/2010 | Bukshpun et al. | 713/170 |

FOREIGN PATENT DOCUMENTS

| | | |
|---|---|---|
| CN | 14408153 A | 4/2003 |
| CN | 101166088 A | 4/2008 |
| GB | 2 336 078 A | 10/1999 |
| JP | 2005071489 A | 3/2005 |
| WO | WO 2004/068784 A1 | 8/2004 |

OTHER PUBLICATIONS

Written Opinion of the International Searching Authority, International Application No. PCT/CN2011/070137, Applicant: Huawei Technologies Co., Ltd., et al., Mailing Date: Apr. 21, 2011, 10 pages.
Liu, R., et al., "Secure Nested Codes for Type II Wiretap Channels," IEEE, ITW, Sep. 2-6, 2007, pp. 337-342.
Thangarm, A., et al., "Applications of LDPC Codes to the Wiretap Channel," IEEE Transactions on Information Theory, vol. 53, No. 8, Aug. 2007, pp. 2933-2945.
"Extended European Search Report," Application No. 11732656.1, Applicant: Huawei Technologies Co., Ltd., Jan. 16, 2013, 7 pages.

* cited by examiner

*Primary Examiner* — Nathan Flynn
*Assistant Examiner* — Trang Doan
(74) *Attorney, Agent, or Firm* — Slater & Matsil, L.L.P.

(57) ABSTRACT

A system and method for securing wireless transmissions is provided. A method for transmitting secure messages includes selecting a bin of codewords from a plurality of bins. The bin of codewords containing a plurality of sub-bins of codewords, and the selecting is based on a first message. The method also includes selecting a sub-bin of codewords from the plurality of sub-bins of codewords based on a second message, selecting a codeword from the sub-bin of codewords, and transmitting the selected codeword to a legitimate receiver.

20 Claims, 3 Drawing Sheets

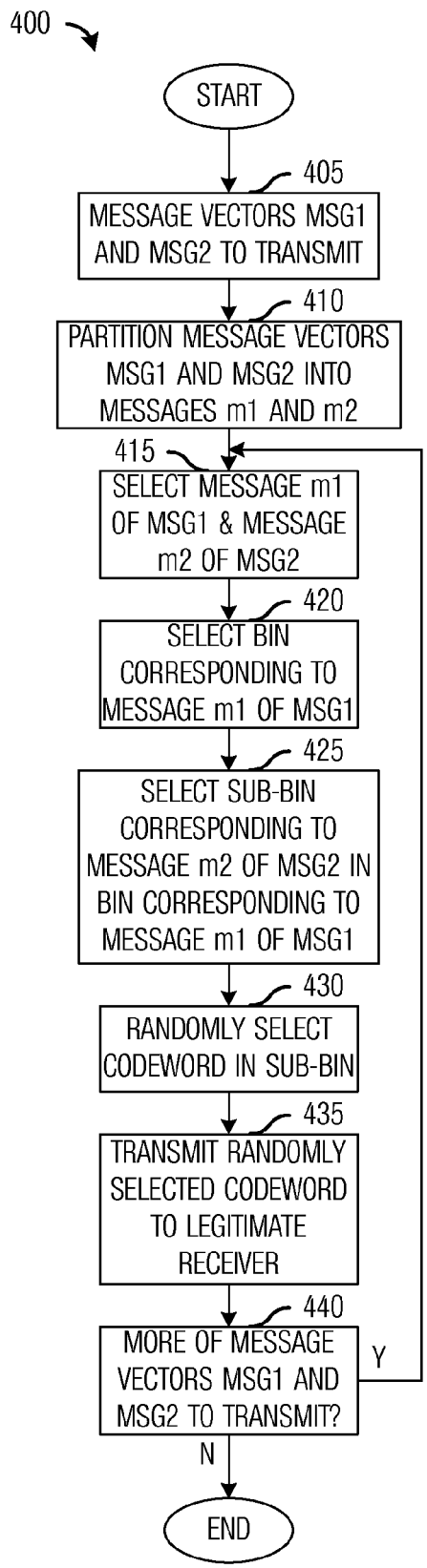
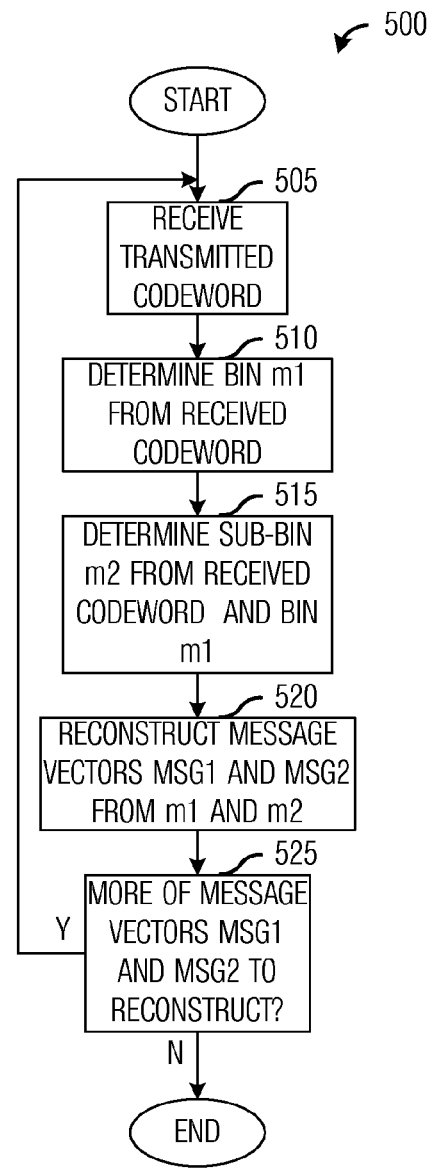
Fig. 4
Fig. 5

SYSTEM AND METHOD FOR SECURING WIRELESS TRANSMISSIONS

TECHNICAL FIELD

The present invention relates generally to wireless communications, and more particularly to a system and method for securing wireless transmissions.

BACKGROUND

In general, securing transmitted information typically involves the application of a security technique to make it difficult if not impossible for an eavesdropper to detect the actual information content of a transmission made to a legitimate receiver. Normally, security may be provided in higher layers of a network, such as in an application layer, wherein a security application may be used to apply the security to the information content of the transmission prior to the actual transmission taking place. For example, the security application may be a program executed by a user who wishes to secure the transmission. Alternatively, the security application may be a hardware security unit that may be used to secure transmissions made by a transmitter used by the user.

However, the higher layer security techniques may usually require that a secret key(s) be shared by a transmitter (the user) and a receiver (the legitimate receiver). Sharing the secret key(s) may be problematic since the security of the security techniques may only be as good as the security present in the sharing of the secret key(s).

SUMMARY OF THE INVENTION

These and other problems are generally solved or circumvented, and technical advantages are generally achieved, by embodiments of a system and method for securing wireless transmissions.

In accordance with an embodiment, a method for transmitting secure messages is provided. The method includes selecting a bin of codewords from a plurality of bins. The bin of codewords containing a plurality of sub-bins of codewords, and the selecting is based on a first message. The method also includes selecting a sub-bin of codewords from the plurality of sub-bins of codewords based on a second message, selecting a codeword from the sub-bin of codewords, and transmitting the selected codeword to a legitimate receiver.

In accordance with another embodiment, a method for receiver operations is provided. The method includes receiving a codeword, determining identifiers to a first message and to a second message based on the received codeword, reconstructing a first message from the identifiers, and reconstructing a second message from the identifiers. The determining makes use of a nested binning code structure used to encode the received codeword.

In accordance with another embodiment, a transmitter is provided. The transmitter includes a scheduler coupled to a message input, a security unit coupled to the scheduler, a security code store coupled to the security unit, and a transmit circuit coupled to the security unit. The scheduler arranges a timing of transmission of messages to a receiver, and the security unit generates a secure codeword from a first message and a second message provided by the scheduler using a nested binning code. The first message has a security level at least equal to a security level of the second message, and the secure codeword is generated from a sub-bin of codewords corresponding to the second message and contained within a bin of codewords corresponding to the first message. The secure code store stores the nested binning code, and the transmit circuit prepares the secure codeword for over-the-air transmission.

An advantage of an embodiment is that an inherent randomness at the source and the communications channel may be exploited to secure communications between a transmitter and a receiver. Therefore, a secret key may not need to be shared, which may enhance the overall security of the security system.

A further advantage of an embodiment is that a different level of security may be provided to information of different importance. Therefore, a higher level of security may be given to higher importance information, while lower importance information may be given a lower security level.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 4 is a flow diagram of transmitter operations in transmitting secured messages using nested binning codes; and FIG. 5 is a flow diagram of receiver operations in receiving secured messages using nested binning codes.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with multiple receivers, at least one of which is a legitimate receiver and at least one of which is an eavesdropper.

Figure 1A:
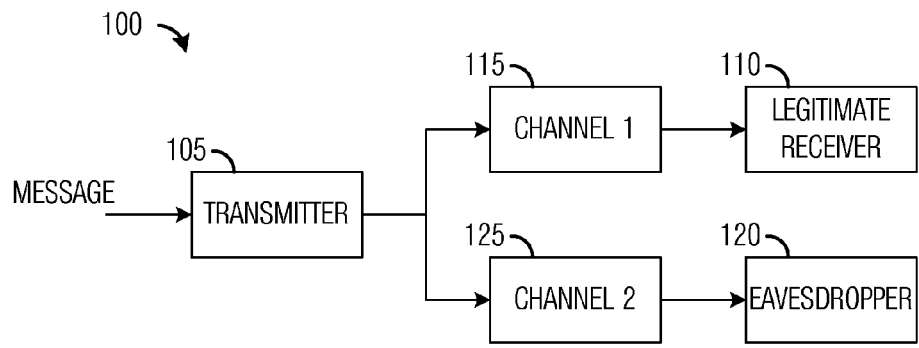
FIG. 1a is a diagram of a wiretap channel model.

FIG. 1a illustrates a wiretap channel model 100. Wiretap channel model 100 includes a transmitter 105 that transmits a message (information) to a legitimate receiver 110 over a first communications channel (channel 1) 115. However, due to a broadcast nature of wireless communications, an eavesdropper 120 may also receive the message over a second communications channel (channel 2) 125.

In a classical setting, both first communications channel 115 and second communications channel 125 may be assumed to be known by transmitter 105. A statistical advantage of first communications channel 115 to legitimate receiver 110 over second communications channel 125 to eavesdropper 120 may be exploited by physical layer security techniques to design coding schemes that may be used to deliver the message reliably to legitimate receiver 110 while maintaining nearly perfect secrecy from eavesdropper 120.

However, in wireless communications, a quality of both first communications channel 115 and second communications channel 125 may change unpredictably over time, rendering classical designs for wiretap channel model 100 useless. The unpredictable change in the quality of the communications channel is known as multipath fading. Whereas it may be reasonable to assume that knowledge of first communications channel 115 is available to transmitter 105 (particularly when a channel feedback information is available), assuming that transmitter 105 has knowledge of second communications channel 125 is unrealistic (since eavesdropper 120 may be an adversary that usually has no incentive to provide channel feedback information to transmitter 105). Therefore, it may be critical that physical layer security techniques be designed to withstand an uncertainty of second communications channel 125.

In communications without security, each possible message may be mapped to a unique codeword which is then transmitted to a receiver over a communications channel. A possible message may correspond to a data unit that is provided to an encoder which maps the message to the unique codeword. An actual message transmitted by the transmitter to the receiver may be larger than or equal to the length of the data unit. For example, if the actual message is ten data units in length, then the actual message may be partitioned into ten possible messages and each possible message may be mapped to a unique codeword by the encoder. The encoder used to map the message to the unique codeword uses a deterministic mapping between the possible messages and the codewords. A communications channel between the transmitter and an eavesdropper is noisy, which may help to confuse the eavesdropper. However, the natural randomness from the communications channel (the noise) may generally not be enough to guarantee perfect security. To further confuse the eavesdropper, additional artificial randomness may need to be injected into the communications channel.

Figure 1B:
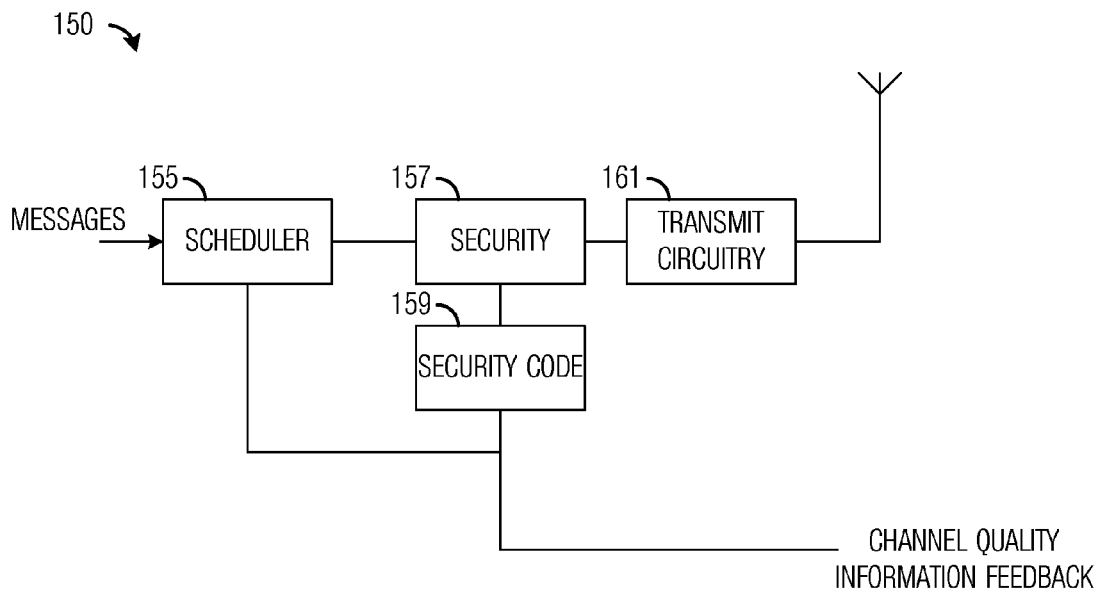
FIG. 1b is a diagram of a portion of a transmitter with physical layer security.

FIG. 1b illustrates a portion of a transmitter 150 with physical layer security. Messages, in the form of bits, symbols, or packets, for example, destined for a plurality of receivers being served by transmitter 150 may be sent to a scheduler 155, which decides which message(s) to which receiver(s) should be transmitted in a given time/frequency opportunity. Messages for receivers selected to receive transmissions may be provided to a security unit 157 which may provide physical layer security using a nested binning code as described below. Security unit 157 may be able to provide differing levels of security based on a desired security level for messages and/or receivers. Operation of security unit 157 is described in detail below. The nested binning code used by security unit 157 may be stored in a security code store 159. According to an alternative embodiment, rather than storing the nested binning code in security code store 159, equations or expressions for generating the nested binning code may be stored in security code store 159 and the nested binning code may be generated as needed.

After the messages have been secured by security unit 157, the secured messages may be provided to transmit circuitry 161, which may process the secured messages for transmission. Operations performed by transmit circuitry 161 may include conversion to an analog representation of the selected codeword, filtering, amplifying, interleaving, coding and modulating, beam forming, and so forth. Some of the operations performed by transmitter unit 150, such as secrecy coding, beam forming, and so on, may make use of channel quality feedback information provided by receivers served by transmitter 150. The representation of the communications channel may also be used by scheduler 155 in its selection of the receivers.

Figure 1C:
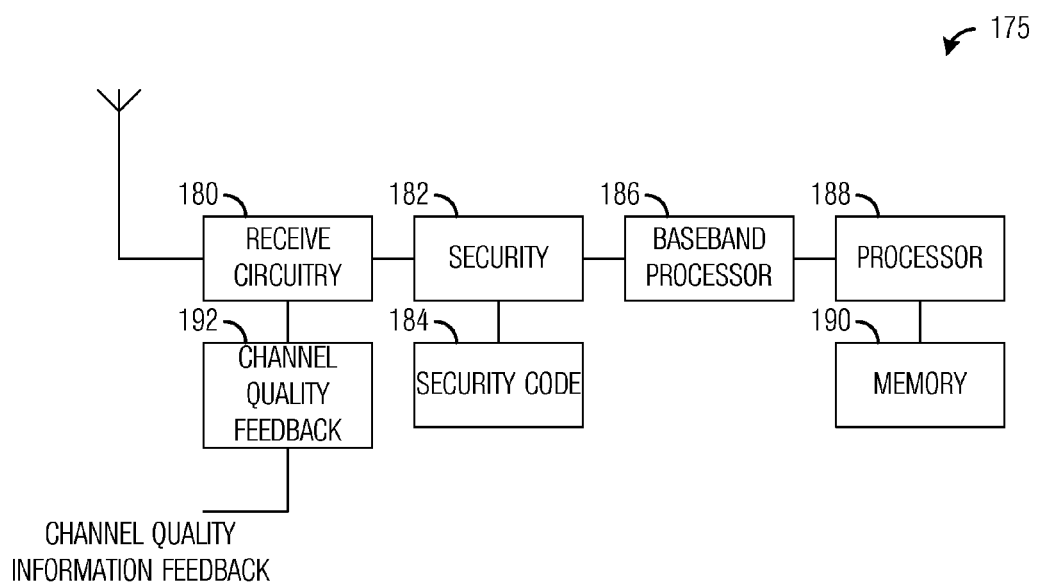
FIG. 1c is a diagram of a portion of a receiver with physical layer security.

FIG. 1c illustrates a portion of a receiver 175 with physical layer security. Information transmitted by a transmitter may be received by receiver 175 by way of an antenna(s). The received information may be provided to receive circuitry 180, which may process the received information. Operations performed by receive circuitry 180 may include filtering, amplification, error detection and correction, modulation, analog-to-digital conversion, and so forth.

A security unit 182 may be used to convert (decode) the received information (after processing by receive circuitry 180), which may be secured using a nested binning code by the transmitter, back into original messages. Security unit 182 may make use of a nested binning code stored in a security code store 184 to decode the secured received information. According to a preferred embodiment, a nested binning codebook used in the decoding may be stored in security code store 184. According to an alternative embodiment, rather than storing the nested binning codebook in security code store 184, equations or expressions for generating the nested binning code may be stored in security code store 184 and the nested binning code may be generated as needed. Estimates of the original messages (decoded by security unit 184) may be provided to a baseband processor 186 to provide final conversion into data that may be used by a processor 188. A memory 190 may be used to store the data if necessary.

A channel quality feedback unit 192 may be used to provide information related to a communications channel between transmitter 150 and receiver 175 back to transmitter 150. The information related to the communications channel may help assist in the securing of information transmitted by the transmitter to receiver 175 as well as improve overall data transmission performance.

Figure 2:
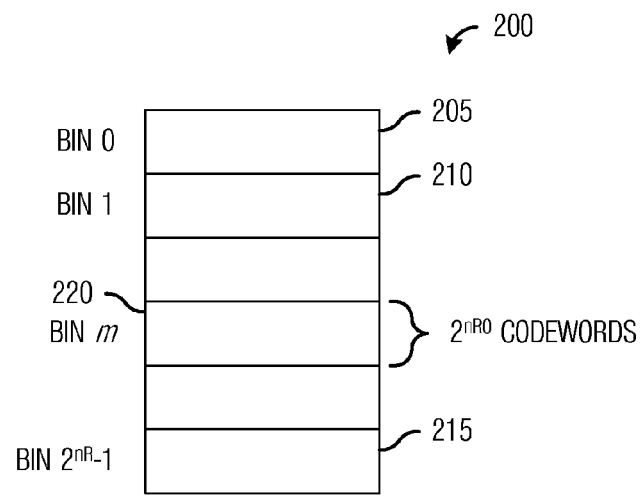
FIG. 2 is a diagram of a structure of a binning code.

FIG. 2 illustrates a structure 200 of a binning code. Structure 200 includes $2^{nR}$ bins, such as bin "0" 205, bin "1" 210, and bin "$2^{nR}-1$" 215, with each bin corresponding to one of the $2^{nR}$ possible messages. Each of the $2^{nR}$ bins comprises a sub-codebook of $2^{nR_0}$ codewords. The sub-codebooks in each of the $2^{nR}$ bins have a rate of $R_0$, which needs to be high enough to confuse the eavesdropper. However, a rate of the entire codebook (the binning code) $R_0+R$ may not exceed the capacity of the communications channel between the transmitter and the legitimate receiver (e.g., first communications channel 115).

In the binning code shown in FIG. 2, each possible message is associated with a bin of multiple codewords. For each possible message, an encoder may randomly select a codeword from the corresponding bin and transmit it to the legitimate receiver over the communications channel. For example, a possible message m may correspond to bin "m" 220. The encoder may select at random one of $2^{nR_0}$ codewords from bin "m" 220 to transmit to the legitimate receiver.

The randomness is intrinsic to the transmitter and may not be shared with either the legitimate receiver or the eavesdropper. The number of codewords in each bin represents an amount of artificial randomness injected into the communications channel. When combined with the natural randomness present in the communications channel between the transmitter and the eavesdropper, the artificial randomness needs to be sufficient to fully confuse the eavesdropper.

In order to ensure reliability at the legitimate receiver and secrecy at the eavesdropper, the codebook (the binning code) should be chosen such that:

For each possible received signal and in each of the bins, there is (at least) one codeword that will confuse the eavesdropper of the transmitted codeword. Therefore, the eavesdropper has no idea which bin the transmitted codeword belongs to and hence is completely confused about the information that was transmitted.

The codewords from all bins together form a channel code that may be reliably decoded by the legitimate receiver.

The information rate R of a binning code may be given by a difference between a rate of the entire codebook and a rate $R_0$ of the sub-codebook in each bin. To maximize the information rate, the entire codebook should be a good channel code with a high rate and the sub-codebooks in each bin should be good confusion codes with low rate. Practical constructions of good binning codes may be based on low density parity check (LDPC) codes and other good linear block codes.

Since the quality of the communications channel between the transmitter and the eavesdropper is unknown, in order to guarantee secrecy it may be necessary to design a binning code based on the worst possible scenario, namely a best possible realization of the communications channel between the transmitter and the eavesdropper. However, the guarantee may come at the expense of squandering opportunities when the communications channel between the transmitter and the eavesdropper is not close to the best possible realization. Nested binning codes may help to overcome problems associated with always guaranteeing secrecy in the best possible realization of the communications channel between the transmitter and the eavesdropper.

Figure 3:
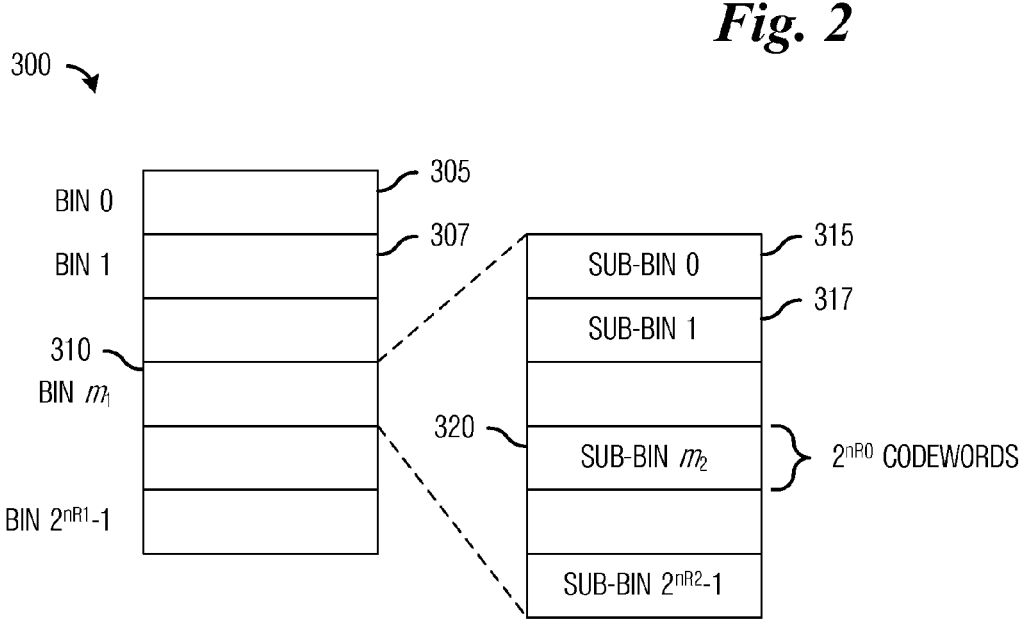
FIG. 3 is a diagram of a structure of a nested binning code for use in transmitting two messages.

FIG. 3 illustrates a structure 300 of a nested binning code for use in transmitting two messages. For discussion purposes, let there be two messages $M_1$ and $M_2$ to be transmitted, where message $M_1$ is more crucial than message $M_2$ from a security view point, meaning that it is more important to ensure secrecy of message $M_1$ than message $M_2$. Although the discussion focuses on protecting two messages with a nested binning code, in general, nested binning codes of the structure disclosed herein may be extended to protect an arbitrary number of messages, such as two, three, four, five, and so forth. Therefore, the discussion of protecting two messages should not be construed as being limiting to either the scope or the spirit of the embodiments.

Structure 300 includes $2^{nR_1}$ bins, such as bin "0" 305 and bin "1" 307, with each bin corresponding to one of the $2^{nR_1}$ possible messages of message $M_1$, where $R_1$ is the code rate of message $M_1$. Each of the $2^{nR_1}$ bins may then be further partitioned into $2^{nR_2}$ sub-bins, for example, bin "$m_1$" 310 comprises $2^{nR_2}$ sub-bins, such as sub-bin "0" 315 and sub-bin "1" 317, with each sub-bin corresponding to one of $2^{nR_2}$ possible messages of message $M_2$, where $R_2$ is the code rate of message $M_2$. Each of the sub-bins may contain $2^{nR_0}$ codewords, for example, sub-bin "$m_2$" 320 contains $2^{nR_0}$ codewords.

Each possible message $m_1 \in \{0,1, \ldots, 2^{nR_1}=1\}$ corresponds to a bin, and within each bin, each possible message $m_2 \in \{0,1, \ldots, 2^{nR_2}-1\}$ corresponds to a sub-bin, where each sub-bin is composed of $2^{nR_0}$ codewords. Therefore, each sub-bin in structure 300 may be indexed by a message pair ($m_1$, $m_2$).

A rate $R_0$ of the sub-codebooks in each sub-bin may need to be high enough to confuse the eavesdropper when the communications channel realization for the eavesdropper is weak. However, a rate $R_0+R_2$ of the sub-codebooks in each bin may need to be high enough to confuse the eavesdropper when the communications channel realization for the eavesdropper is strong. A rate of the entire codebook (structure 300) $R_0+R_1+R_2$ may not exceed the capacity of the communications channel between the transmitter and the legitimate receiver.

To encode a specific message pair ($m_1$, $m_2$), the transmitter may randomly choose a codeword in a corresponding bin/sub-bin combination and transmits the chosen codeword to the legitimate receiver. Since each bin contains a larger number of codewords than in each sub-bin, message $m_1$ receives more security protection than message $m_2$, and by definition, message $M_1$ receives more security protection than message $M_2$. To ensure reliability at the legitimate receiver and perfect secrecy at the eavesdropper, the nested binning code may be chosen such that:

For each possible received codeword of a lower targeted security level (i.e., message $m_2$) and in each of the sub-bins, there is (at least) one codeword that will confuse the eavesdropper for the actual transmitted codeword. Therefore, the eavesdropper has no idea which sub-bin the actual transmitted codeword is from and hence is completely confused about which message ($m_1$, $m_2$) was sent.

The codewords from all sub-bins of a single bin together form a confusion code to protect message $m_1$. That is, for each possible received codeword of a higher targeted security level and in each of the bins, there is (at least) one codeword that will confuse the eavesdropper for the actual transmitted codeword. Therefore, the eavesdropper has no idea which bin the actual transmitted codeword is from and hence is completely confused about which message $m_1$ was sent.

The codewords from all codeword bins together form a channel code that can be decoded by the legitimate receiver.

Through the use of the nested binning code structure, when the realization of the communications channel of the eavesdropper is strong, message $M_2$ becomes part of the artificial randomness used to protect message $M_1$. When the realization of the communications channel of the eavesdropper is weaker, the artificial randomness inherent in the nested binning codes may be sufficient to protect both messages $M_1$ and $M_2$. The use of the nested binning codes may be more efficient than injecting large amounts of artificial randomness when the realization of the communications channel of the eavesdropper is strong.

The security protection levels may be chosen based on specific applications. Generalizations to multilevel security protection may be achieved by considering multilevel nested binning codes rather than just the two-level nested binning code discussed above.

As an example, if structure 300 was modified to support three messages $M_1$, $M_2$, and $M_3$, then each sub-bin would be further partitioned into $2^{nR_3}$ sub-sub-bins, with each sub-sub-bin corresponding to one of $2^{nR_3}$ possible messages of message $M_3$, where $R_3$ is the code rate of message $M_3$. Each of the sub-sub-bins may contain $2^{nR_0}$ codewords. Similarly, structure 300 may be further modified to support four messages $M_1$, $M_2$, $M_3$, and $M_4$ with each sub-sub-bin being further partitioned into $2^{nR_4}$ sub-sub-sub-bins, with each sub-sub-sub-bin corresponding to one of $2^{nR_4}$ possible messages of message $M_4$, where $R_4$ is the code rate of message $M_4$. Each of the sub-sub-sub-bins may contain $2^{nR_0}$ codewords.

It may be possible to construct an unequal security protection code using a nested binning of linear block codes. Consider a linear code triple $(C_0(n), C_1(n), C_2(n))$ of block length n, where $C_0(n)$ is a fine code with rate $R_0$, $C_1(n)$ is an intermediate code with rate $R_0$-$R_1$, and $C_2(n)$ is a coarse code with rate $R_0$-$R_1$-$R_2$ so that $$C_0(n) \supseteq C_1(n) \supseteq C_2(n).$$

The fine code $C_0(n)$ may be used as a mother code, which may be partitioned into $2^{nR_1}$ sub-codes consisting of the intermediate code $C_1(n)$ and its cosets $c_i^{(1)}+C_1(n)$ for i=1, ..., $2^{nR_1}-1$. Each coset corresponds to a high-priority message $m_1$. Further, partition the intermediate code $C_1(n)$ into $2^{nR_2}$ sub-codes consisting of the fine code $C_2(n)$ and its cosets $c_j^{(2)}+C_2(n)$ for j=1, ..., $2^{nR_2}-1$.

The partitioning will induce a partition of the coset $c_i^{(1)}+C_1(n)$ into sub-cosets $c_i^{(1)}+C_2(n)$ and $c_i^{(1)}+c_j^{(2)}+C_2(n)$ for j=1, ..., $2^{nR_2}1$. Each sub-coset corresponds to a secure message pair $(m_1, m_2)$, where $m_2$ is a low-priority message. For a given secure message pair $(m_1, m_2)$, the encoder randomly selects, via a uniform distribution, for example, a codeword in the sub-cosets $c_{m_1}^{(1)}+c_{m_2}^{(2)}+C_2(n)$ where $c_0^{(1)}$ and $c_0^{(2)}$ are all-zero codewords.

Assume that both of the communications channels of the legitimate receiver and the eavesdropper are binary-input additive white Gaussian noise channels (BI-AWGN). The energy per coded symbol to a one-sided noise spectral density ratio $\lambda_0$ for the legitimate receiver channel is $E_S/N_0$. The legitimate receiver channel may be denoted BI-AWGN($\lambda_0$). To guarantee reliability at the legitimate receiver, the fine code $C_0(n)$ needs to be a good BI-AWGN($\lambda_0$) code. Exemplary classes of good linear codes include, for example, LDPC codes and repeat-accumulate (RA) codes, whose performance may be characterized by a signal-to-noise ratio (SNR) threshold $\lambda_0$ of BI-AWGN($\lambda_0$).

To guarantee perfect secrecy of the high-security message $M_1$ at the eavesdropper with an energy per coded symbol to the one-sided noise spectral density ratio of at most $\lambda_1=E_S/N_1$, a dual code of the intermediate code $C_1(n)$ may be needed to be a good code for a binary erasure channel (BEC) with erasure probability of $$1-2Q(\sqrt{2\lambda_1^*}),$$

where $Q(\cdot)$ is the Gaussian-Q function, and $\lambda_1^*$ is the SNR ratio threshold of BI-AWGN($\lambda_1$).

Similarly, to guarantee perfect secrecy of both messages $M_1$ and $M_2$ at the eavesdropper with an energy per coded symbol to the one-sided noise spectral density ratio of at most $\lambda_2=E_S/N_2 \leq \lambda_1$, a dual code of the coarse code $C_2(n)$ may be needed to be a good code for a BEC with erasure probability of $$1-2Q(\sqrt{2\lambda_2^*}),$$

where $Q(\cdot)$ is the Gaussian-Q function, and $\lambda_2^*$ is the SNR ratio threshold of BI-AWGN($\lambda_2$).

FIG. 4 illustrates a flow diagram of transmitter operations 400 in transmitting secured messages using nested binning codes. Transmitter operations 400 may be indicative of operations taking place in a transmitter, such as transmitter 105, as it transmits a secured message(s) to a legitimate receiver, such as legitimate receiver 110. The secured message(s) transmitted by the transmitter may be secured using a nested binning code, such as one shown in FIG. 3. Transmitter operations 400 may occur while the transmitter is in a normal operating mode and while the transmitter has messages to transmit to the legitimate receiver.

Transmitter operations 400 may begin with the transmitter receives message vectors $MSG_1$ and $MSG_2$ to transmit to the legitimate receiver (block 405). According to an embodiment, message vector $MSG_1$ is more crucial than message vector $MSG_2$ from a security view point. Although the discussion focuses on protecting two messages with a nested binning code, in general, nested binning codes of the structure disclosed herein may be extended to protect an arbitrary number of messages, such as two, three, four, five, and so forth, each having a different level of security requirement. Therefore, the discussion of protecting two messages should not be construed as being limiting to either the scope or the spirit of the embodiments.

If either message vector $MSG_1$ or message vector $MSG_2$ or both message vectors are longer in length than a possible message (i.e., a data unit), then the transmitter may partition the message vector(s) into multiple messages of length equal to a possible message (block 410). If either message vector $MSG_1$ or message vector $MSG_2$ or both messages are equal to a possible message in length, then partitioning may not be necessary. For example, message vector $MSG_1$ may be partitioned into one or more messages $m_1$ and message vector $MSG_2$ may be partitioned into one or more messages $m_2$.

The transmitter may then select a message $m_1$ from the one or more messages $m_1$ partitioned from message vector $MSG_1$ and a message $m_2$ from the one or more messages $m_2$ partitioned from message vector $MSG_2$ (block 415). Using the selected message $m_1$ the transmitter may select a bin corresponding to the selected message $m_1$ (block 420). Using the selected message $m_2$ the transmitter may select a sub-bin corresponding to the selected message $m_1$ (block 425). According to an embodiment, the selected sub-bin corresponding to the selected message $m_2$ may be contained within the selected bin corresponding to the selected message $m_1$.

The transmitter may then select a codeword from the $2^{nR_0}$ codewords contained in the selected sub-bin (block 430). According to an embodiment, the transmitter may randomly select the codeword from the selected sub-bin. The transmitter may then transmit the selected codeword to the legitimate receiver (block 435). Operations, such as conversion to an analog representation of the selected codeword, filtering, amplifying, interleaving, coding and modulating, beam forming, and so forth, to the selected codeword may be omitted from the flow diagram to help maintain simplicity. The transmitter may perform a check to determine if there are any additional portions of message vector $MSG_1$ and message vector $MSG_2$ to transmit (block 440). If there are additional portions of message vector $MSG_1$ and message vector $MSG_2$ to transmit, the transmitter may return to block 415 to select additional message $m_1$ from the one or more messages $m_1$ partitioned from message vector $MSG_1$ and message $m_2$ from the one or more messages $m_2$ partitioned from message vector $MSG_2$ to secure and transmit. If there are no additional portions of message vector $MSG_1$ and message vector $MSG_2$ to transmit, transmitter operations 400 may then terminate.

FIG. 5 illustrates a flow diagram of receiver operations 500 in receiving secured messages using nested binning codes. Receiver operations 500 may be indicative of operations taking place in a legitimate receiver, such as legitimate receiver 110, as it receives a secured message(s) from a transmitter, such as transmitter 105. The secured message(s) received by the legitimate receiver may be secured using a nested binning code, such as one shown in FIG. 3. Receiver operations 500 may occur while the legitimate receiver is in a normal operating mode.

Receiver operations 500 may begin with the legitimate receiver receiving a transmitted codeword transmitted by the transmitter (block 505). The received codeword may be a contaminated (by communications channel noise, for example) version of a codeword generated from an uncoded message $(m_1, m_2)$ where message $m_1$ is selected from the one or more messages $m_1$ partitioned from message vector $MSG_1$ and message $m_2$ from the one or more messages $m_2$ partitioned from message vector $MSG_2$, where message vectors $MSG_1$ and $MSG_2$ are messages transmitted by the transmitter to the legitimate receiver. If there is no communications channel noise (or other noise), for example, then the received codeword may be equal to the codeword generated from the uncoded message $(m_1, m_2)$.

Using the received codeword, the legitimate receiver may determine a bin corresponding to message $m_1$ (block 510). The legitimate receiver may determine an identifier of the bin corresponding to message $m_1$. For example, the identifier may be an index to the bin. The legitimate receiver may make use of a nested binning code generating equation or expression to determine the identifier of the bin corresponding to message $m_1$. For example, the nested binning code generating equation or expression may be used to dynamically generate codewords that may be compared with the received codeword to find the identifier of the bin corresponding to message $m_1$. The nested binning code generating equation or expression used by the legitimate receiver may be the same nested binning code generating equation or expression used by a transmitter to generate the transmitted codeword.

Then, using the bin corresponding to message $m_1$ and the received codeword, the legitimate receiver may determine a sub-bin corresponding to message $m_2$ (block 515). The legitimate receiver may determine an identifier of the sub-bin corresponding to message $m_2$. For example, the identifier may be an index to the sub-bin. The legitimate receiver may make use of a nested binning code generating equation or expression to determine the identifier of the sub-bin corresponding to message $m_2$. For example, the nested binning code generating equation or expression may be used to dynamically generate codewords that may be compared with the received codeword to find the identifier of the sub-bin corresponding to message $m_2$. The nested binning code generating equation or expression used by the legitimate receiver may be the same nested binning code generating equation or expression used by a transmitter to generate the transmitted codeword.

Alternatively, determining the identifiers of the bin and the sub-bin may involve searching through a list of possible codewords. For example, the list of possible codewords may include possible codewords generated by the nested binning codes and identifiers of bins and sub-bins associated with each possible codeword.

Using the identifiers of the bin and the sub-bin determined from the received codeword, the legitimate receiver may reconstruct the message vectors $MSG_1$ and $MSG_2$ (block 520).

In an alternative embodiment, rather than independently determining the identifier of a bin corresponding to message $m_1$ and the identifier of the sub-bin corresponding to message $m_2$ based on the received codeword, the legitimate receiver may determine both the identifier of the sub-bin corresponding to message $m_2$ and the identifier of the bin corresponding to message $m_1$ simultaneously. Estimation of the transmitted message pair $(m_1, m_2)$ may be determined based on the received codeword by searching through possible codewords and selecting a codeword that most closely matches the received codeword, for example. The selected codeword that most closely matches the received codeword may have associated with it information regarding the identifier of the sub-bin corresponding to message $m_2$ as well as the identifier of a bin corresponding to message $m_1$. The searching of the most closely matches the received codeword may be realized via many decoders, for example, any variations of LDPC decoder, turbo decoders.

In another alternative embodiment, the most closely matching codeword may not need to be found, but rather part of the codeword is treated as random noise and do not need to be recovered. Only part of the codeword that corresponds to the message pair $(m_1, m_2)$ need to be determined with sufficient accuracy. This is the case, for example, if systematic linear code is used in the transmitter, and the corresponding systematic linear decoder is used in the receiver.

The legitimate receiver may then perform a check to determine if there are more of the message vectors $MSG_1$ and $MSG_2$ to reconstruct (block 525). If there are more of the message vectors $MSG_1$ and $MSG_2$ to reconstruct, then the legitimate receiver may return to block 505 to receive additional transmitted codewords. If there are no more of the message vectors $MSG_1$ and $MSG_2$ to reconstruct, then receiver operations 500 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitter operations, the method comprising:
    selecting, by a transmitter, a bin of codewords from a plurality of bins, wherein the bin of codewords containing a plurality of sub-bins of codewords, and wherein the selecting is based on a first message;
    selecting, by the transmitter, a sub-bin of codewords from the plurality of sub-bins of codewords based on a second message;
    selecting, by the transmitter, a codeword from the sub-bin of codewords; and
    transmitting, by the transmitter, the selected codeword to a legitimate receiver.

2. The method of claim 1, wherein the first message has a security level better than or equal to a security level of the second message.

3. The method of claim 1, wherein selecting a codeword comprises randomly selecting a codeword from the sub-bin of codewords.

4. The method of claim 1, wherein there are $2^{nR_1}$ bins, and each bin is partitioned into $2^{nR_2}$ sub-bins, where n is the length of the codeword, and $R_1$ and $R_2$ are code rates.

5. The method of claim 4, wherein code rate $R_1$ is determined based on the channel condition between the transmitter and the legitimate receiver, and the channel condition between the transmitter and an eavesdropper.

6. The method of claim 1, wherein each bin of codewords is partitioned from a first code with a first code rate.

7. The method of claim 6, wherein the first code is a linear code $C_0$.

8. The method of claim 7, wherein a first bin corresponds to a sub-code $C_1$ of the first code $C_0$, and a second bin corresponds to a coset code of the sub-code $C_1$.

9. The method of claim 7, wherein a first sub-bin corresponds to a sub-sub-code $C_2$, and a second sub-bin corresponds to a coset code of sub-sub-code $C_2$.

10. The method of claim 7, wherein the sub-bin of codewords is selected from a plurality of sub-bins of codewords, and wherein each sub-bin of codewords is partitioned from a sub-code.

11. The method of claim 1, wherein the first message is a portion of a first whole message, wherein the second message is a portion of a second whole message, and wherein selecting a bin of codewords, selecting a sub-bin of codewords, selecting a codeword, and transmitting the selected codeword are repeated for remaining portions of the first whole message and remaining portions of the second whole message.

12. A method for receiver operations, the method comprising:
    receiving, by a receiver, a codeword;
    determining, by the receiver, identifiers to a first message and to a second message based on the received codeword, wherein the determining makes use of a nested binning code structure used to encode the received codeword;
    reconstructing, by the receiver, a first message from the identifiers; and
    reconstructing, by the receiver, a second message from the identifiers.

13. The method of claim 12, wherein determining identifiers comprises:
    determining a sub-bin identifier to a sub-bin of codewords within the bin of codewords based on the received codeword; and
    determining a bin identifier to a bin of codewords based on the received codeword.

14. The method of claim 13, wherein determining a sub-bin identifier comprises
    generating codewords with a nested binning code structure;
    selecting a generated codeword that most closely matches the received codeword; and
    setting a sub-bin identifier associated with the generated codeword as the sub-bin identifier.

15. The method of claim 14, wherein determining a bin identifier comprises setting a bin identifier associated with the generated codeword as the bin identifier.

16. The method of claim 12, wherein determining identifiers comprises:
    searching a list of possible codewords for a codeword that most closely matches the received codeword; and
    retrieving a bin identifier to a bin of codewords and a sub-bin identifier to a sub-bin of codewords associated with the codeword that most closely matches the received codeword.

17. The method of claim 12, wherein the first message is a portion of a first whole message, wherein the second message is a portion of a second whole message, and wherein receiving a codeword, determining identifiers, reconstructing a first message, and reconstructing a second message are repeated for remaining portions of the first whole message and remaining portions of the second whole message.

18. A transmitter comprising:
    a scheduler coupled to a message input, the scheduler configured to arrange a timing of transmission of messages to a receiver;
    a security unit coupled to the scheduler, the security unit configured to generate a secure codeword from a first message and a second message provided by the scheduler using a nested binning code, wherein the first message has a security level at least equal to a security level of the second message, and wherein the secure codeword is generated from sub-bin of codewords corresponding to the second message and contained within a bin of codewords corresponding to the first message;
    a security code store coupled to the security unit, the secure code store configured to store the nested binning code;
    a transmit circuit coupled to the security unit, the transmit circuit configured to prepare the secure codeword for transmission, including the transmit circuit configured to convert the secure codeword to an analog secure codeword; and
    an antenna coupled to the transmit circuit, the antenna configured to transmit the analog secure codeword.

19. The transmitter of claim 18, wherein the security code store configured to store all possible codewords of the nested binning code.

20. The transmitter of claim 18, wherein the security code store configured to store an equation used to generate the nested binning code.

* * * * *